US009306927B2

(12) United States Patent
Vernal et al.

(10) Patent No.: US 9,306,927 B2
(45) Date of Patent: *Apr. 5, 2016

(54) SINGLE LOGIN PROCEDURE FOR ACCESSING SOCIAL NETWORK INFORMATION ACROSS MULTIPLE EXTERNAL SYSTEMS

(71) Applicant: Facebook, Inc., Menlo Park, CA (US)

(72) Inventors: Michael Steven Vernal, San Francisco, CA (US); Wei Zhu, Cupertino, CA (US); James M. Leszczenski, Walnut Creek, CA (US); Joshua E. Elman, Palo Alto, CA (US); David Brookes Morin, San Francisco, CA (US); Charles Duplain Cheever, Palo Alto, CA (US); Ruchi Sanghvi, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,192

(22) Filed: May 6, 2014

(65) Prior Publication Data

US 2014/0245407 A1    Aug. 28, 2014

Related U.S. Application Data

(63) Continuation of application No. 12/508,526, filed on Jul. 23, 2009, now Pat. No. 8,763,152.

(51) Int. Cl.
*H04L 29/06* (2006.01)
*G06F 21/00* (2013.01)
(Continued)

(52) U.S. Cl.
CPC .............. *H04L 63/08* (2013.01); *G06F 21/41* (2013.01); *H04L 63/0815* (2013.01)

(58) Field of Classification Search
CPC ...... H04L 63/08; H04L 63/0815; G06F 21/41
See application file for complete search history.

(56) References Cited

U.S. PATENT DOCUMENTS

| 5,764,890 A | 6/1998 | Glasser et al. |
| 6,223,177 B1 | 4/2001 | Tatham et al. |

(Continued)

FOREIGN PATENT DOCUMENTS

| CN | 103024698 A * | 4/2013 | ...... H04M 1/274533 |
| WO | WO 2011143761 A1 | 11/2011 | |

OTHER PUBLICATIONS

Yung Shin Van Der Sype, Jean-Marc Seigneur; Case study: legal requirements for the use of social login features for online reputation updates; Mar. 2014; SAC '14: Proceedings of the 29th Annual ACM Symposium on Applied Computing; Publisher: ACM; pp. 1698-1705.*

(Continued)

*Primary Examiner* — Andrew Nalven
*Assistant Examiner* — Courtney Fields
(74) *Attorney, Agent, or Firm* — Fenwick & West LLP

(57) ABSTRACT

A social networking system contains information describing users of the social network and various connections among the users. A user can access multiple external systems that communicate with the social networking system to access information about the users of the social networking system. Login status of the user account on the social networking system is maintained. If the login status of the user account on the social networking system indicates that the user is not logged in, the user is required to provide authentication information. If the login status of the user account indicates that the user is logged in, social network information is provided to the user via an external system, subject to the privacy settings of users of the social networking system. If the user logs out from an external system, the user is also logged out from the social networking system.

19 Claims, 5 Drawing Sheets

(51) Int. Cl.
  *G06F 21/41* (2013.01)
  *H04W 4/12* (2009.01)
  *H04M 1/275* (2006.01)

(56) References Cited

U.S. PATENT DOCUMENTS

| | | | |
|---|---|---|---|
| 6,519,629 | B2 | 2/2003 | Harvey et al. |
| 6,608,636 | B1 | 8/2003 | Roseman |
| 6,750,881 | B1 | 6/2004 | Appelman |
| 7,032,006 | B2 | 4/2006 | Zhuk |
| 2004/0158617 | A1 | 8/2004 | Shanny et al. |
| 2005/0216300 | A1 | 9/2005 | Appelman et al. |
| 2007/0150603 | A1* | 6/2007 | Crull et al. ............ 709/227 |
| 2009/0144392 | A1 | 6/2009 | Wang et al. |
| 2010/0228590 | A1 | 9/2010 | Muller et al. |
| 2010/0274815 | A1 | 10/2010 | Vanasco |
| 2010/0318925 | A1 | 12/2010 | Sethi et al. |

OTHER PUBLICATIONS

Degenhart, C. et al., "AOL in a Nutshell: A Desktop Guide to America Online," Jun. 1998, Chapter 3, pp. 22-43; Chapter 9, pp. 129-148; Chapter 10, pp. 149-184.

Gross, R. et al., "Information revelation and privacy in online social networks"; Nov. 2005; WPES '05: Proceedings of the 2005 ACM workshop on Privacy in the electronic society; Publisher: ACM; pp. 71-80.

Sarin, S., et al., "Software for Interactive On-Line Conferences," Conference on Supporting Group Work, Proceedings of the Second ACM-SIGOA Conference on Office Information Systems, pp. 46-58, May 1984.

United States Office Action, U.S. Appl. No. 12/508,526, Aug. 14, 2013, twenty-nine pages.

United States Office Action, U.S. Appl. No. 12/508,526, Jan. 14, 2013, twenty pages.

United States Office Action, U.S. Appl. No. 12/508,526, May 15, 2012, thirty-four pages.

* cited by examiner

SINGLE LOGIN PROCEDURE FOR ACCESSING SOCIAL NETWORK INFORMATION ACROSS MULTIPLE EXTERNAL SYSTEMS

FIELD OF THE INVENTION

This invention relates to social networking and in particular to accessing information from a social network across multiple external systems outside of the social network.

BACKGROUND

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to constantly customize interactions of the system with the user. For example, a website selling books may keep track of a users previous purchases and provide the user with information on related books during subsequent interactions with the system. Information in a user's profile may also be used by the system to target advertisements that are of interest to the user. Using information collected from and about users results in a system that is more efficient and beneficial for both the user and the system.

However, prior systems, including websites, lack the ability to use information associated with a user's social connections or activities to customize and/or personalize the user's experience while using the system. Access to information about the user's social interactions and/or the activities of a user's social connections (e.g. friends, family, co-workers, etc.) improves the user's experience while using the system and increases the chance that the user will use the system in the future. For example, users visiting a website that sells books may be interested in books that their social connections have looked at, book reviews or comments provided by their social connections, and other social network information that might inform their purchases of book from the website. The system itself also benefits, because it can leverage information about the user and the user's social connections to more accurately determine what a user might be interested in. Such a system can use social network information to customize a user's experience and target products, services and/or advertisements to the user.

Typical systems do not possess sufficient information about a user's social connections to customize the user's experience or effectively target advertising to the user. Assembling enough information about a user's social connections for these purposes requires a system to interact with a large number of users over an extended period of time. The majority of websites will not have the resources, expertise, or user base required to build and maintain a system of the scale necessary to capture, organize and maintain a sufficient amount of information about users' social connections and their activities. Thus, users of these systems will have an inferior experience, and the customization/personalization provided by these sites is unlikely to accurately take into account or reflect information about the user's social connections and their activities.

Even if the problems described above were solved so that multiple other systems or websites were able to track and manage a user's social connections, this would lead to additional problems that would have to be solved. For example, to access social information in multiple systems, a user may be required to provide authentication for each system that the user accesses. The information required to authenticate at each system can be different, requiring the user to keep track of the authentication information for each system, thus further reducing the quality of the user experience.

SUMMARY

In addition to maintaining information provided by a user and information about a user's activities on the system, a social networking system also maintains information related to a user's social connections. Information collected by a social networking system about its users is referred to herein as "social network information." Social network information can be highly valuable to an external system that does not or cannot maintain such information about its users. Embodiments of the invention allow multiple external systems to access social network information, while also providing a mechanism for managing the login status of a user of these multiple systems. This frees users from the need to maintain authentication information separately for each external system and allows external systems to leverage social network information for various purposes.

Embodiments present computer implemented methods and systems for accessing social network information across multiple external systems. A social networking system maintains login status associated with a user account for a user of the social networking system. A request for social network information associated with the user account is received. The social network information is requested for use by an external system. The social networking system determines the login status of the user account associated with the request. If the login status of the user account indicates that the user is not logged in, the user is required to input authentication information for the user account. On the other hand, if the login status indicates that the user is logged into the social networking system, a response including social networking information is sent to the requestor without requiring the user to input authentication information for the user account.

If the user responds with correct authentication information, the login status of the user account is changed to indicate that the user is logged in and the social networking system responds to the request with the social network information. In an embodiment, the user sends a request to link external systems to the user account on the social networking system. If a determination is made that the user account of the external system is not connected to the user account of the social networking service, an interface is displayed to the user, allowing the user to link the two accounts. Accordingly, once the user provides correct authentication information to access an external system, the user is logged into all the external systems that are linked to the user account of the social networking system.

In an embodiment, the request for information is obtained directly from an external system. Alternatively, the request for information is received from a client device that is processing a markup language document received from an external system. In an embodiment, the social networking system sends a subset of the requested information subject to privacy settings of users of the social networking system. In another embodiment, the social networking system sends the requested information along with the privacy settings of relevant users of the social networking system to an external system. The external system enforces the privacy settings of the users of the social networking system in order to ensure that a user who is not allowed to access some information in the social networking system is not allowed to access the same information via the external system. In an embodiment, if the user requests to log out from an external system, the social networking system updates the login status of the user account to indicate that the user is logged out. Accordingly, the user is logged out from all the external systems linked to the social networking system and needs to provide authentication information to log back into any of the external systems.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Interactions Between an External System and a Social Network

A social networking system offers its users the ability to communicate and interact with other users of the social networking system. Users join the social networking system and then add connections to a number of other users to whom they desire to be connected. Systems outside of the social networking system, called external systems, can access information available in the social networking system. Users of the external system can be users of a social networking system. The external system can access information from the social networking system using an Application Programming Interface (API) associated with or provided by the social networking system. Alternatively, the external system can send a markup language document to the client device with instructions for interacting with the social networking system. The external system may use the information obtained from the social networking system for various purposes.

Figure 1:
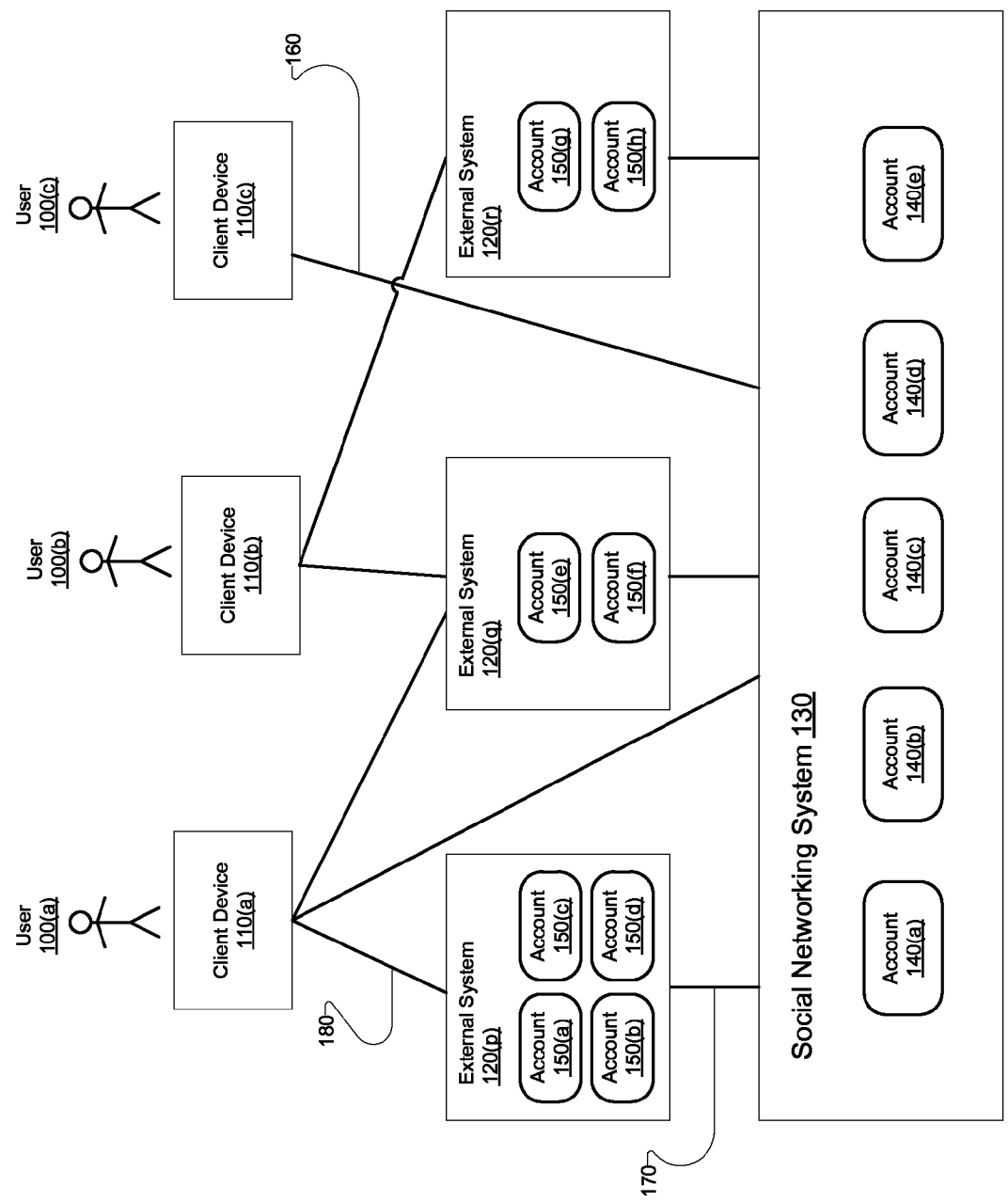
FIG. 1 is high-level diagram illustrating how a user can connect to multiple external systems and the social networking system, in accordance with one embodiment of the invention.

FIG. 1 shows the interaction between a client device 110 of a user 100, external systems 120 and a social networking system 130. A user 100 may be a user of the social networking system 130 and/or user of the external system 120. The social networking system 130 keeps a user account 140 for each user of the social networking system 130. An external system 120 may keep accounts 150 for users of the external system 120. A user may have accounts 150 on multiple external systems 120, for example, user 100(a) can have an account 150(a) on external system 120(p) and account 150(e) on external system 120(q). Also, a user can have an account 150 on an external system 120 but no account on a different external system 120.

An external system 120 can have several users 100 that interact with the system and a user 100 can interact 180 with multiple external systems 120. An external system 120 may interact with the social networking system 130 to retrieve information available in the social networking system 130. The user 100 can also directly interact 160 with the social networking system 130. A user can link an account 150 on an external system 120 with the user's account 140 on the social networking system 130. A user can also link an external system with the user's account 140 on the social networking system 130 by providing details of the external system to the social networking system 130. In this scenario, the user may not have an account on the external system 120. If an external system 120 is not linked to the user account of social networking system 130, a request may be sent to the user to link the two accounts. The request may present an interface to the user, allowing the user to input authentication information. If the user successfully provides the authentication information the external system is linked to the social networking system 130. If a user links an external system 120 with the user's account 140 on the social networking system 130, the social networking system 130 stores information related to the external system 120 (including the users activities on the external system 120) along with the account 140 of the social networking system 130. The information related to linked external systems stored by the social networking system 130 is used in an embodiment by the social networking system 130 to facilitate the process of the user logging into multiple external systems 120 (and can also be used for other purposes, including to customize or enhance the user's experience on the social networking system, to target advertisements, etc.). In an embodiment, the login status of all the external system 120 linked to the social networking system 130 is treated as the same. Accordingly, if a user logs into any one of the external systems 120, the login status for all the external systems 120 (that have been linked by the user with the account on the social networking system) is assumed to be "logged in." Similarly, if the user logs out of any one of these external systems 120, the login status for all the external systems 120 is assumed to be "logged out." The login status for all the linked external systems 120 is stored in the social networking system 130.

In an embodiment, the social networking system 130 maintains a login status of the user 100 in the user account 140 when the user logs into any of the external systems 120. If the user is not logged into any of the external system 120, the login status of the user indicates "not logged in." If the user attempts to access social network information from an external system 120(a), the user is requested to provide authentication information for the social networking system 130. If the user successfully authenticates, the login status of the user in the social networking system 130 is changed to "logged in." If the user attempts to access any other external system 120, for example, external system 120(b), the login status of the user in the social networking system 130 is checked. If the login status of the user is determined to be "logged in," the user is allowed access to the external system 120(b). Hence the user is able to access social network information from multiple external systems 120 by authenticating into the social networking system 130 once.

In accordance with an embodiment of the invention, the external system 120 can access social networking system 130 information or provide information to the social networking system 130 using an Application Programming Interface (API) associated with or provided by the social networking system 130. Alternatively, an external system 120 may send a markup language document to the client device 110 with instructions for accessing the social networking system 130. The client device 110 processes the instructions in the markup language document and accesses the social networking system 130 for either providing information or retrieving information. The external system may obtain information from the social networking system 130 for various purposes. For example, the external system may present activities of a user's connections on the external system to the user. The external system may also send information related to the user's activities performed on the external system to the social networking system 130. For example, information related to purchases made by a user on an external system may be sent to the social networking system. The information related to purchases made by the user in the external system can be made available to connections of the user in the social network as a form of social advertisement.

The social networking system 130 maintains information about connections among its users. As used herein, the term "connection" refers to any other user (whether an individual or other entity) of the social networking system to whom a user has formed a connection, association, or relationship via the social networking system. Connections may be added explicitly by a user or automatically created by the social networking system based on common characteristics of the users (e.g., users who are alumni of the same educational institution). Connections in social networks can be one or two-way connections. For example, if Bob and Joe are both users and connected to each other in the website, Bob and Joe have a two-way connection. If Bob is interested in learning more information about Joe, but there is not a reciprocal connection, a one way connection may be formed with Bob being connected to Joe, but Joe not being connected to Bob. The connection between users may be a direct connection; however, some embodiments of a social network allow the connection to be indirect via one or more levels of connections. The social networking system keeps a record of information for each user and the connections among the users. The record of users and their connections in the social networking system may be called a "social graph."

System Architecture

Figure 2:
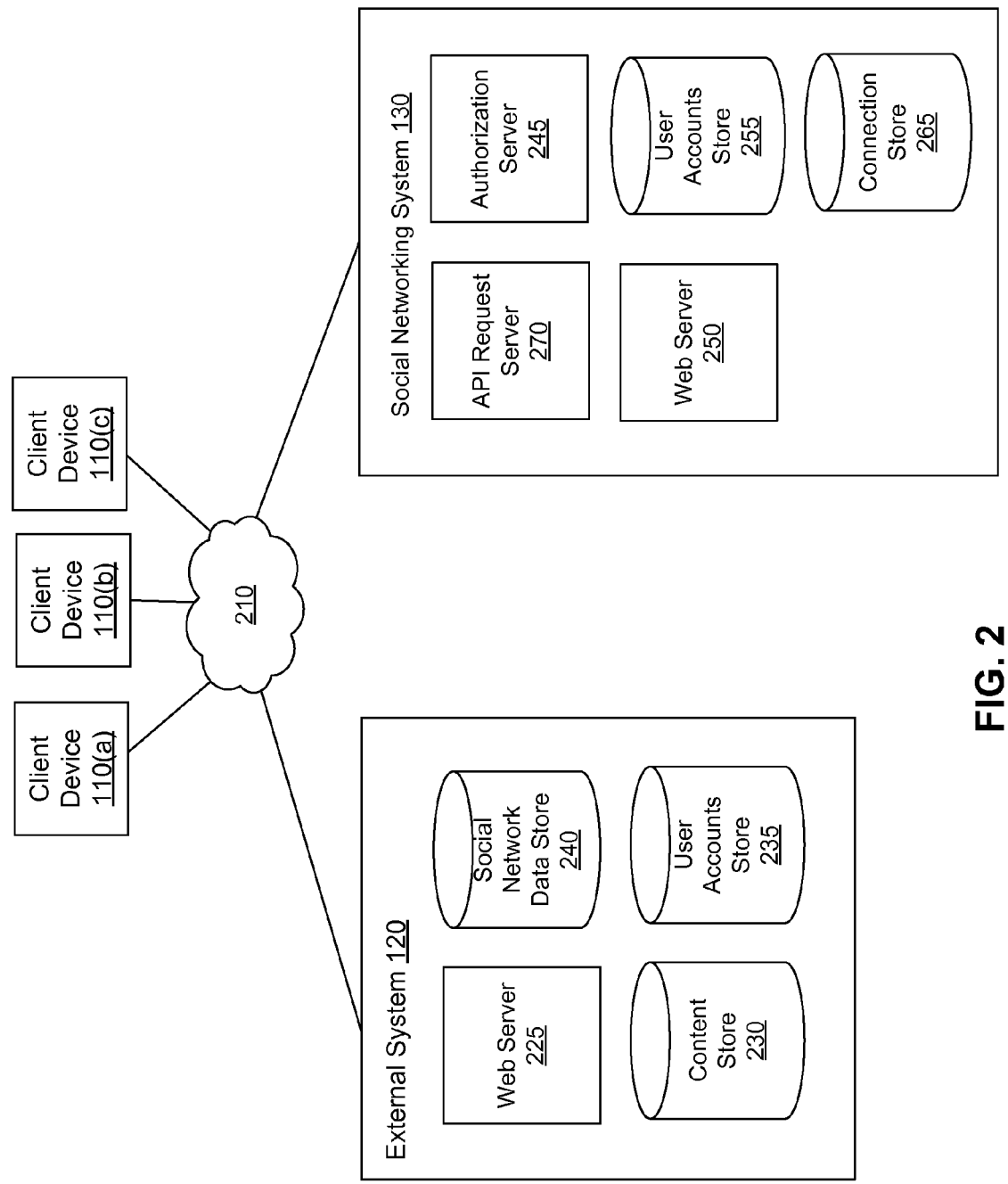
FIG. 2 is a diagram of the system architecture that allows a user to access multiple external systems that interact with a social networking system for retrieving social network information, in accordance with an embodiment of the invention.

FIG. 2 is a high level block diagram illustrating a system environment suitable for allowing a user to access multiple external systems 120 that interact with a social networking system 130 for retrieving social network information. The system environment comprises one or more client devices 110, one or more external systems 120, a social networking system 130, and a network 210. In alternative configurations, different and/or additional modules can be included in the system.

The client devices 110 comprise one or more computing devices that can receive user input and can transmit and receive data via the network 210. For example, the client devices 110 may be desktop computers, laptop computers, smart phones, personal digital assistants (PDAs), or any other device including computing functionality and data communication capabilities. The client devices 110 are configured to communicate via network 210, which may comprise any combination of local area and/or wide area networks, using both wired and wireless communication systems.

FIG. 2 contains a block diagram of the social networking system 130. The social networking system 130 includes a web server 250, an API request server 270, an authorization server 245, a user accounts store 255, and a connection store 265. FIG. 2 also contains a block diagram of the external system 120. The external system 120 includes a web server 225, a content store 230, a user accounts store 235, and a social network data store 240. In other embodiments, the social networking system 130 or the external system 120 may include additional, fewer, or different modules for various applications. Conventional components such as network interfaces, security mechanisms, load balancers, failover servers, management and network operations consoles, and the like are not shown so as to not obscure the details of the system.

The social networking system 130 comprises a computing system that allows users to communicate or otherwise interact with each other and access content as described herein. The social networking system 130 stores user information in user accounts store 255, for example, user profile information including biographic, demographic, and other types of descriptive information, such as work experience, educational history, hobbies or preferences, location, and the like. The social networking system 130 further stores data describing one or more connections between different users in the connection store 265. The connection information may indicate users who have similar or common work experience, group memberships, hobbies, or educational history. Additionally, the social networking system 130 includes user-defined connections between different users, allowing users to specify their relationships with other users. For example, these user-defined connections allow users to generate relationships with other users that parallel users' real-life relationships, such as friends, co-workers, partners, and so forth. Users may select from predefined types of connections, or define their own connection types as needed.

The web server 250 links the social networking system 130 via the network 210 to one or more client devices 110; the web server 250 serves web pages, as well as other web-related content, such as Java, Flash, XML, and so forth. In some embodiments, the web server may be used for communicating with the external system 120. For example, requests sent by the external system 120 can be received by the web server 250 and processed. The web server 250 may include a mail server or other messaging functionality for receiving and routing messages between the social networking system 130 and the client devices 210. The messages can be instant messages, queued messages (e.g., email), text and SMS messages, or any other suitable messaging technique.

The API request server 270 allows external websites 200 to access information from the social networking system 130 by calling APIs. The API request server 270 may also allow external systems 120 to send information to social networking website by calling APIs. An external system 120 sends an API request to the social networking system 130 via the network 210. The API request is received at the social networking system 130 by the API request server 270. The API request server 270 processes the request by calling the appropriate program code to collect any appropriate response, which is then communicated back to the external system 120 via the network 210. In an embodiment, the web server 250 receives a request and calls the API server 270 in order to process the request. The information based on the response from the API server 270 is sent in response to the request received by the web server 250. A device that does not communicate with the web server 250 can communicate directly with the API request server 270 to obtain information.

The authorization server 245 enforces the privacy settings of the users of the social networking system. The privacy setting of a user determines how particular information associated with a user can be shared. The privacy setting comprises the specification of particular information associated with a user and the specification of the entity or entities with whom the information can be shared. The entities with which information can be shared may include other users, applications, external systems, or any entity that can potentially access the information. The information that can be shared by a user comprises user profile information photos, videos, links, text entries, phone numbers associated with the user, user's connections, actions taken by the user such as adding a connection, changing user profile information, and any other information maintained by the social networking system that is associates with the user. Systems and methods for allowing an external system to access information in a social networking system using APIs that enforce privacy settings defined in the social networking system are disclosed in U.S. application Ser. No. 12/324,761, filed Nov. 26, 2008, which is incorporated by reference in its entirety. Systems and methods for allowing users to control accessibility of content in a social networking system is disclosed in U.S. application Ser. No. 12/485,856 filed on Jun. 16, 2009, which is incorporated by reference in its entirety. Systems and methods for providing privacy settings for applications associated with a user profile are disclosed in Ser. No. 12/154,886 filed on May 27, 2008, which is incorporated by reference in its entirety.

Figure 3:
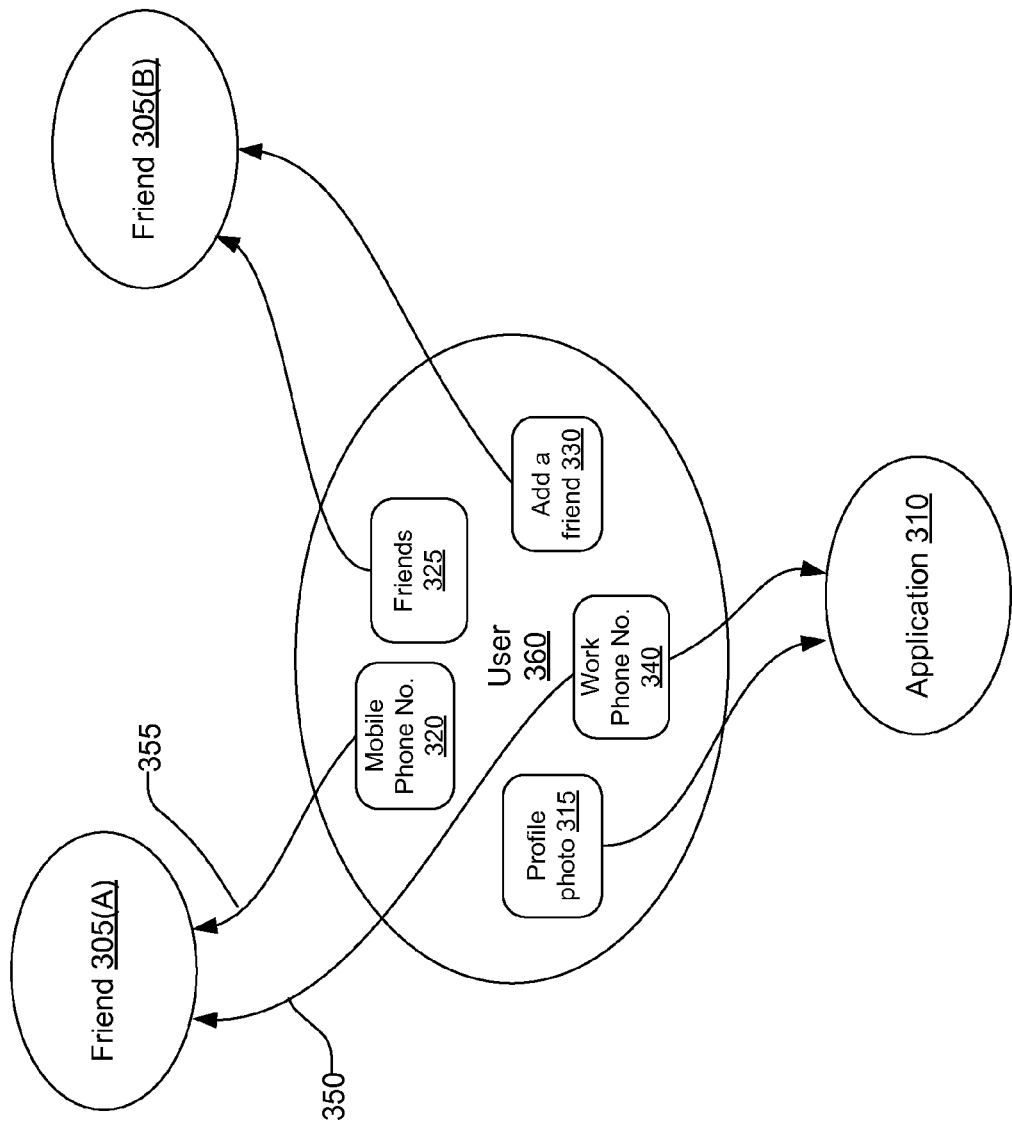
FIG. 3 is an example diagram of privacy settings of a user of a social network, in accordance with one embodiment of the invention.

FIG. 3 illustrates an example of how the privacy settings of a user 360 of the social networking system 130 control the accessibility of information associated with the user 360 to the user's friends 305 or applications 310. As shown in FIG. 3, the arrow 350 indicates that friend 305(A) is allowed to access the work phone number 340 of user 360, and arrow 355 indicates that friend 305(A) is allowed to access the mobile phone number of the user 360. Friend 305(A) does not have access to information such as profile photo 315 of the user 360 or the user's friends list 325. On the other hand, friend 305(B) is allowed to access the friends list 325. The information associated with a user includes actions taken by a user such as the action of adding a new friend 330. The user 360 can completely block another user or an application from accessing any information associated with the user 360. A user or an application that is blocked by the user 360 does not have access to any information associated with user 360.

As discussed above, the social networking system 130 maintains data about objects with which a user may interact. To this end, the user accounts store 255 and the connection store 265 store instances of the corresponding type of objects maintained by the social networking system 130. Each object type has information fields that are suitable for storing information appropriate to the type of object. For example, the user account store 255 contains data structures with fields suitable for describing a user's profile, the login status of a user, and the user accounts in external systems 120 that are linked to a corresponding account in the social networking system 130. When a new object of a particular type is created, the social networking system 130 initializes a new data structure of the corresponding type, assigns a unique object identifier to it, and begins to add data to the object as needed. This might occur, for example, when a user becomes a member of the social networking system 130, the social networking system 130 generates a new instance of a user account in the user account store 255, assigns a unique identifier to the user account, and begins to populate the fields of the user account with information provided by the user.

The web server 225 of the external system 120 links the external system 120 via the network 210 to one or more client devices 205; the web server 250 serves web pages, as well as other web-related content, such as Java, Flash, XML, and so forth. The content presented to the client device 205 is stored in the content store 230. In some embodiments, the web server 225 may be used for interacting with the social networking system 130. For example, requests and responses sent by the social networking system 130 can be received by the web server 225 for processing.

The external system 120 maintains a user accounts store 235 to maintain data associated with accounts of users of the external system 120. The user accounts store 235 may store information associated with a user including user name and password, as well as other information relevant to the external system 120. For example, email address, mailing address, and billing information. In some embodiments, the external system 120 can also store additional information, including user actions or interests, or any other information gathered by the external system associated with user.

Accessing Social Network Information Using External Systems

Figure 4:
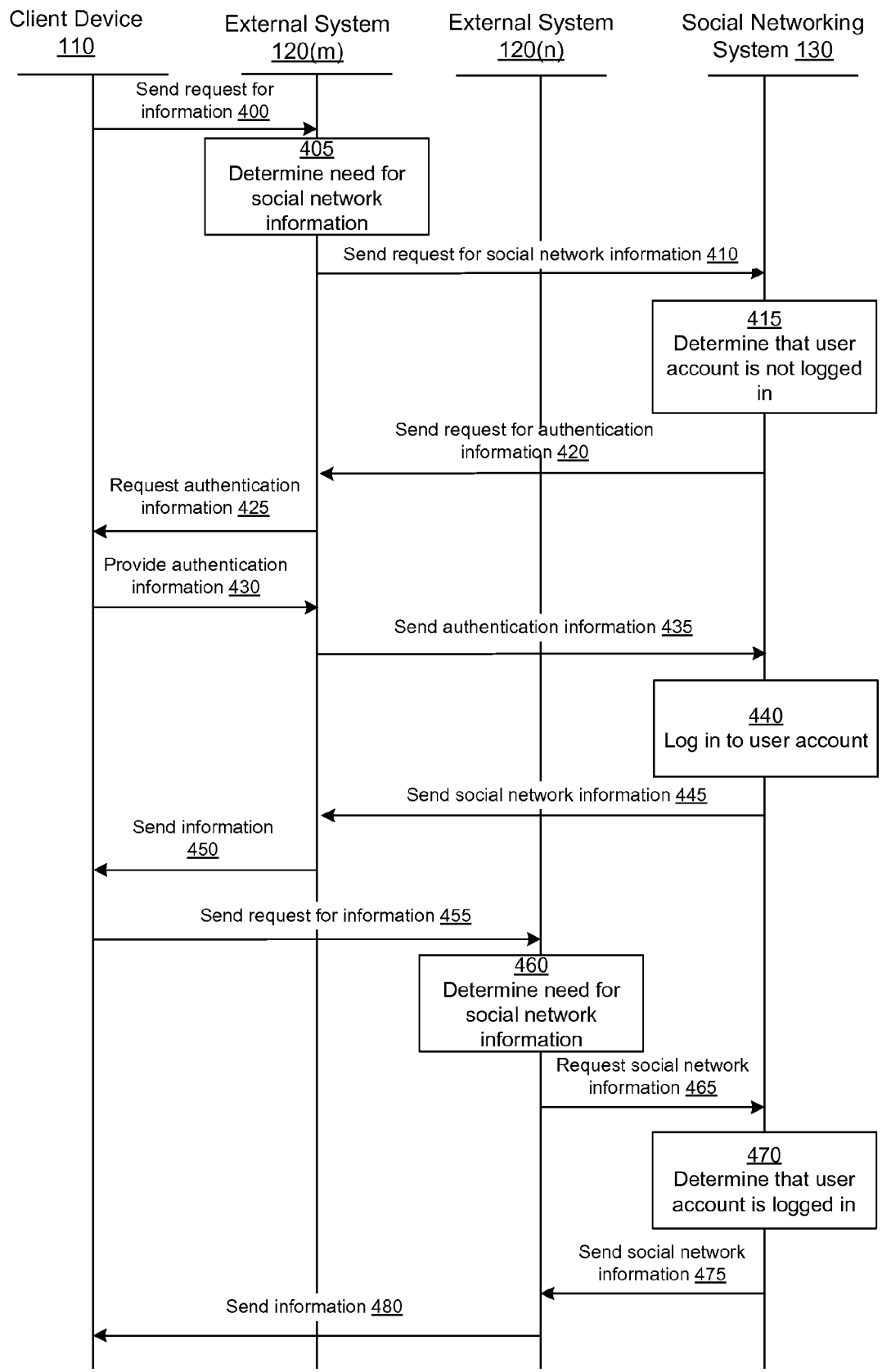
FIG. 4 is an interaction diagram of a process in which a client device obtains social network information from a social networking system from multiple external systems and the external systems interact directly with the social networking system, in accordance with one embodiment of the invention.

FIG. 4 is an interaction diagram of a process in which a client device obtains social network information from multiple external systems 120 and the external systems 120 interact with the social networking system 130. The user 100 accesses the external system 120(m), causing the client device 110 to send 400 a request for information from the external system 120(m) to the social networking system 130. The external system 120(m) determines 405 if there is a need for social network information from the social networking system 130 and, if so, what information is required to respond to the request 400 for information. The external system 120(m) sends 410 request for the required social network information from the social networking system 130. In an embodiment, the request 410 may be sent to the API request server 270 to execute an API provided by the social networking system 130. The API request server 270 communicates with the authorization server 245 to check the login status of the user account in the user accounts store 255. If the user hasn't logged into the social networking system 130, the login status of the user account is determined to be "not logged in." If the user is determined to be not logged in to the social networking system 130, the authorization server 245 needs authentication information, for example, user name and password from the user before the social network information requested 410 is provided to the external system 120(m). Hence, the social networking system 130 sends 420 a request for authentication information for the user to the external system 120(m).

The external system 120(m) requests 425 authentication information from the client device 110. In an embodiment, the request 425 presents an interface to the user allowing the user to input authentication information for the social networking system 130, for example, a username and password. The interface presented to the user on the client device 110 can be a popup window. In an embodiment, the username and password requested are for the user account 140 of the user stored in the user accounts store 255 in the social networking system 130. The user interface presented to the user may explicitly display information to the user indicating that the user is logging into the social networking system 130 by presenting a uniform resource locator (URL) of the social networking system 130.

The authentication information provided 430 by the user is sent 435 by the external system 120 to the social networking system 130. If the user provides 430 the correct authentication information, the user is logged into the social networking system 130 and the login status of the user's account in the user account store 255 is set to "logged in." If the user successfully logs into the social networking system 130, social network information requested by the external system 120(*m*) is sent 445 to external system 120(*m*). The external system 120(*m*) sends 450 the information requested 400 by the client device 110 to the client device 110. In an embodiment, the information sent 445 by the social networking system 130 is a subset of the requested 410 information determined based on the privacy settings of the users of the social networking system 130. In another embodiment, the external system may use the social network information to determine content from the external system 120 that is sent 450 to the client device 110. In another embodiment, the external system 120 may perform some processing based on the social network information received but may not send any information to the client device in response.

In an embodiment, the user has an account stored in the user accounts store 235 of the external system 120(*m*), which has different authentication information compared to the user account stored in the user accounts store 255 in the social networking system 130. The user can send information to the social networking system 130, linking the user account in the external system 120 with the user account in the social networking system 130. If the user account in the external system 120 is linked with the user account in the social networking system 130, the external system 120 is considered to be linked to the user account in the social networking system 130. In an embodiment, the user is allowed to link the external system 120 to the user account in the social networking system 130, for example, if the user does not have an account in the external system 120. If an external system is linked to the user account in the social networking system 130, the user may be presented with a user interface that allows the user to enter authentication information. When the user successfully presents the required information for authentication, the user is automatically logged into the social networking system 130, thereby changing the login status of the user account 140 stored in the user accounts store 255 to "logged in." If the two accounts are not linked together, the user is presented with a user interface to link the two accounts by inputting authentication information for the two accounts, for example, the usernames and passwords of the two accounts.

In an embodiment, the user may not have an account that is stored on the external system 120. Based on the information provided to the external system 120, the external system 120 determines that the user has an account with the social networking system 130. In one embodiment the external system 120 can determine if the user has an account on the social networking system 130 by communicating with the social networking system 130. In one embodiment, the client device checks a session cookie associated with the social networking system 130 on the client device that indicates that the user has an account on the social networking system. The session cookie may also indicate whether the user is currently logged into the social networking system. Alternatively, the markup language document sent by external system to the client device can cause the client device to send a request to the social networking system to determine if the user has an account on the social networking system. In another embodiment, the external system directly sends a request to the social networking system using APIs provided by the social networking system to determine if the user has an account on the social networking system. The session created by the user with the external system 120 is treated as an account, even though no account is explicitly created by the external system 120 for the user. In one embodiment, the user may provide input indicating that the user has an account on the social networking system 130. For example, a browser link or a user interface button may be provided on the external system 120 to allow the user to indicate that the user has an account in the social networking system 130. The user clicks on the browser link or the user interface button to indicate that the user has an account on the social networking system 130 and would like to link the session with the external system 120 to the account in the social networking system 130. Accordingly, multiple sessions created by the user on different external systems 120 can execute the process shown in FIG. 4 for interacting with the social networking system 130 without requiring the user to provide authentication information separately for each session. In an embodiment, if the user does not have an explicit account stored on the external system, an explicit account can be automatically created on the external system based on the information obtained from the social networking system. This allows creation of account on the external system for use by the external system without requiring the user to enter various details required to create the account.

When the user is logged into the social networking system 130, the user can send a request for information 455 to another external system 120(*n*). If the external system 120(*n*) determines 460 a need for social network information, the external system 120(*n*) requests 465 the social network information from the social networking system 130. The request 465 may be an API call to the API request server 270. If the social networking system 130 determines that the user account 140 for the user of the client device 110 has a login status "logged in," the social networking system 130 sends 475 the requested social network information to the external system 120(*n*). In an embodiment, the information sent 475 by the social networking system is a subset of the requested 465 information determined based on the privacy settings of the users of the social networking system 130. The external system 120(*n*) sends 480 the information requested 455 to the client device 110. In an embodiment, the external system processes the information to combine the social network information with information available in the external system and sends the combined information to the client device 110. In another embodiment, information obtained from the social networking system is not sent to the client device but instead used for processing to determine information that may be subsequently displayed to the user. In another embodiment, social networking system information may be used to determine whether specific content from the external system is displayed to the user or not. For example, the age of a user obtained from the social network may be used to determine of specific content can be displayed to the user or not. Alternatively, activities performed by the user in the social networking system may be used to determine the content displayed to the user. For example, a member active in particular social groups may be displayed content determined based on the members activities.

Figure 5:
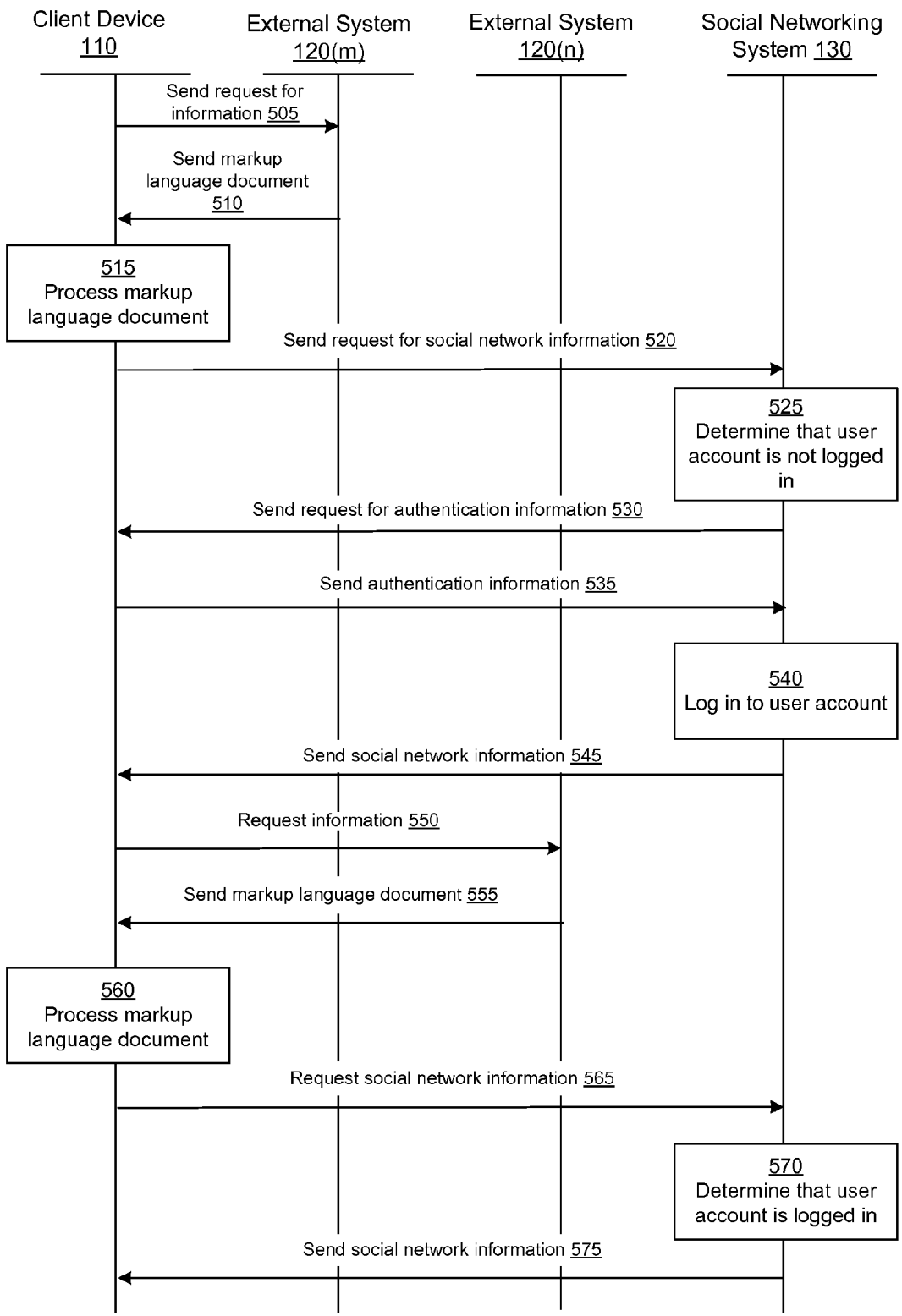
FIG. 5 is an interaction diagram of a process in which a client device obtains social network information from multiple external systems and the client receives markup language document with instructions to interact with the social networking system, in accordance with one embodiment of the invention.

FIG. 5 is an interaction diagram of a process in which a client device obtains social network information from multiple external systems 120 and the client device 110 receives a markup language document from the external system with instructions for interacting with the social networking system 130. When the user 100 accesses an external system 120(m) using the client device 110, the client device 110 sends 505 a request for information to the external system 120(m). The external system 120(m) sends 510 a markup language document to the client device 110. The markup language document contains instructions for the client device 110 to access the social networking system 130 for information used for displaying the markup language document. The client device 110 processes 515 the markup language document. The processing 515 of the instructions in the markup language document causes client device 110 to send 520 a request for social network information to the social networking system 130. In an embodiment, the request is sent to the web server 250 of the social networking system 130. In another embodiment, the request is sent to the API request server 270 of the social networking system 130.

The social networking system 130 checks the login status of the user account 140 stored in the user accounts store 255 of the social networking system 130. If the social networking system 130 determines that the login status of user account 140 indicates that the user is not logged in, the social networking system 130 sends a request for authentication information to the client device 110. In an embodiment, the request 530 presents an interface to the user allowing the user to input authentication information for the social networking system 130, for example, the username and password. The interface presented to the user on the client device 110 can be a popup window. The authentication information presented by the user is sent 535 to the social networking system 130. If the user presents the correct authentication information, the user is logged into the social networking system 130 and the login status of the user's account in the user account store 255 is set to "logged in." If the user successfully logs into the social networking system 130, social network information requested by the external system 120(m) is sent 545 to the client device 110. The client device 110 uses the social network information to render the markup language document for display. In an embodiment, markup language document includes instructions to process the information obtained from the social networking system determine the information rendered for display. For example, the information obtained from the social networking system may be combined with content from the external system in order to present a combination of the information. Alternatively, the information obtained from the social networking system may be used to determine which content from the external system is displayed on the client device 110.

The user 100 accesses an external system 120(n) using the client device 110, after the access to the external system 120(m) described above resulting in the user getting logged into the social networking system 130. The client device 110 sends 550 a request for information to the external system 120(n). The external system 120(n) sends 555 a markup language document to the client device 110. The client device 110 processes 560 the markup language document. The markup language document contains instructions for the client device 110 to access the social networking system 130 for social network information used for rendering the markup language document for display. The processing 560 of the instructions in the markup language document causes client device 110 to send 565 a request for social network information to the social networking system 130. In an embodiment, the request is sent to the web server 250 of the social networking system 130. The social networking system 130 determines that the login status of the user account 140 stored in the user accounts store 255 of the social networking system 130 is "logged in." Accordingly, the social networking system 130 does not require any authentication from the user and sends 575 the requested 565 social network information to the client device 110. The information sent 575 by the social networking system 130 may be determined based on the privacy settings of the users of the social networking system 130.

In an embodiment, a subset of the social network information requested 410, 465, 520, 565 may be sent 445, 475, 545, 575 by the social networking system 130 based on privacy settings of the users of the social networking system 130. For example, the privacy settings may restrict the information that an external system 120 is allowed to access. The social network information provided to the external system is the subset of the requested information that the external system 120 is allowed to access based on the user's privacy settings. Furthermore, the social network information requested may be information associated with the connections of the user in the social networking system 130. The subset of social network information provided to the external system is determined based on the privacy settings of the user as well as the privacy settings of the user's connections in the social networking system 130. The enforcement of the privacy settings ensures that a user who is not allowed to see specific information associated with another user within the social networking system is not allowed to see the same information outside of the social networking system context, for example, using an external system 120.

In an embodiment, the privacy settings are not enforced by the social networking system and the information requested 410, 465 by an external system is sent 445, 475 by the social networking system to the external system along with the privacy setting information of the members of the social networking system. The external system enforces the privacy settings information of the members of the social networking system and makes sure that a user who is not allowed to see specific information within the social networking system is not allowed to see the same information in the external system. In another embodiment, specific types of privacy settings may be enforced by the social networking system, whereas other types of privacy setting information may be communicated to the external system and enforced by the external system. In an embodiment corresponding to FIG. 5, social networking system sends 530, 575 the information requested 520, 565 by the client device along with the privacy setting information of the members of the social networking system. The markup language document processed by the client device includes instructions to enforce privacy settings of users of the social network. The client device enforce privacy settings while rendering the markup language document in order to male sure that only the information allowed to the user in the social networking system is displayed on the client device.

An embodiment in which the external systems 120 are websites, a browser redirect mechanism may be used for or sending 520, 565 the request from the client device 110 to the social networking system 130. A redirect mechanism that does not present the details of the redirect, for example, the address of the social networking system 130 provides a better user experience. In embodiments, where the external system 120 and social networking system 130 are websites, a hidden frame redirect may be used for sending 520 the request for social network information or for sending 535 the authentication information from the client device 110 to the social networking system 130. The hidden frame redirect provides a better user experience compared to a redirect that explicitly displays the request sent to the social networking system 130 in the user interface, such as a browser redirect that displays the URL of the website being redirected to. The hidden frame redirect does not display the URL of the website being redirected to making the redirect process transparent to the user and may also provide improved performance compared to an explicit browser redirect.

Another embodiment uses instructions provided in a scripting language that can be executed on the client device 110 for sending 520 the request for social network information or for sending 535 the authentication information from the client device 110 to the social networking system 130. An example of a scripting language that can be used for a client device 110 is the JAVASCRIPT language. In another embodiment, the markup language document contains custom tags that can be interpreted by a scripting engine using a custom tag library. The custom tags provide the instructions necessary for the client device 110 to send 520 the request for social network information or to send 535 the authentication information from the client device 110 to the social networking system 130.

In one embodiment, the request for authentication information sent 420, 530 by the social networking system 130 includes security questions to the user based on social network information associated with the user available on the social networking system 130. The security question may be based on social network information associated with the connections of the user available on the social networking system 130. The security question based on social network information associated with the user is called a social CAPTCHA (an acronym for "Completely Automated Turing Test To Tell Computers and Humans Apart"). The user is successfully authenticated by the social networking system 130 if the user provides correct answers to one or more security questions presented to the user. For example, a social CAPTCHA may ask the user a question that requires the question to know the profile status that the user posted on the social networking system 130 or an action taken by the user on the social networking system 130. A social CAPTCHA may ask a member of a social network to identify an image of one of the member's connections in the social network. In some embodiments, the rigorousness of the security questions may be determined based on suspiciousness of the session requesting information. Systems and methods for presenting social CAPTCHA are disclosed in U.S. application Ser. No. 12/399, 723, filed Mar. 6, 2009, which is incorporated by reference in its entirety.

A user can send a log out message to an external system 120 for logging out from the external system 120. In an embodiment, when the user logs out from any one of the external systems 120 linked with the social networking system 130, the user is logged out from the social networking system 130. If the user logs out from an external system 120, a request is sent to the social networking system 130 to update the login status of the user's account in the social networking system 130 to "not logged in." As a result, the user is logged out of the social networking system 130 and is considered logged out from all external systems linked to the social networking system. Subsequently, if the user attempts to access information from any external system 120, the user is requested to input authentication information again so as to log into the social networking system 130. The request to log out from the social networking system 130 may be sent to the social networking system 130 by the external system 120 using APIs of the social networking system 130. Alternatively, external system 120 can send a markup language document to the client device 110 in response to the request to logout form the external system 120. The markup language document can contain instructions that when executed by the client device 110, cause the client device 110 to send the request to the social networking system 130 for logging out from the social networking system 130.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
maintaining a single login status associated with a user account for a user of a social networking system;

receiving a plurality of requests for social network information, wherein each request originates from an external system outside of the social networking system, and the social network information is maintained by the social networking system and is associated with the user account of the social networking system; and determining whether a user account of the external system is linked to the user account of the social networking system, and determining the single login status of the user account of the social networking system, and responsive to determining the single login status and whether the user accounts are linked:

if the single login status indicates that the user account of the social networking system is not logged in, requiring authentication information for the user account of the social networking system before providing social network information and responsive to receiving information indicative of successful authentication, updating the single login status to indicate that the user account of the social networking system is logged in, or if the single login status indicates that the user account of the social networking system is logged in and the user accounts are linked, responding to each request by providing the social network information to the external system and providing access to the external system from another external system.

2. The method of claim 1, wherein the external system comprises a website.

3. The method of claim 1, wherein the request for social network information is received from a client device.

4. The method of claim 1, wherein the request for social network information comprises a hidden frame redirect from a client device.

5. The method of claim 1, wherein the request for social network information is received from a client device processing a markup language document received from the external system.

6. The method of claim 1, wherein requiring the user to input authentication information for the user account comprises providing an interface for the user to input authentication information for the user account.

7. The method of claim 6, wherein the external system provides the interface for the user to input authentication information for the user account.

8. The method of claim 1, wherein the request is in response to executing instructions provided in a scripting language.

9. The method of claim 1, wherein responding to the request comprises sending a subset of social network information subject to privacy settings of the users of the social networking system.

10. The method of claim 1, wherein responding to the request comprises sending social network information and privacy settings maintained by the social networking system.

11. The method of claim 1, wherein the received request for social network information is responsive to a hidden frame redirect from a client device.

12. The method of claim 1, wherein determining the single login status comprises checking a session cookie associated with the social networking system.

13. The method of claim 1, further comprising:
responsive to determining that the single login status indicates that the user account is logged in and that the user account of the one or more external systems is not linked to the user account of the social networking system, linking the user account of the one or more external system to the user account of the social networking system, wherein the linking allows access of the one or more external systems to any other of the one or more external systems.

14. The method of claim 1, further comprising:
responsive to determining that the external system is not linked to the user account on the social networking system, providing the user with a user interface that allows the user to link the external system to the user account on the social networking system.

15. The method of claim 1, further comprising:
responsive to determining that the single login status indicates that the user account is not logged into the social networking system, requiring the user to answer one or more security questions based at least in part on social network information stored in the social networking system before responding to the request with the social network information.

16. The method of claim 15, wherein the security questions are based at least in part on information related to the user's connections in the social networking system.

17. The method of claim 16, wherein the security questions are based on social CAPTCHA data.

18. The method of claim 1, wherein the social network information sent in response to the request comprises a subset of the requested information determined based on privacy settings maintained by the social networking system.

19. A computer program product comprising a computer-readable non-transitory storage medium storing instructions thereon, the instructions when executed by a processor cause the processor to:

maintain a single login status associated with a user account on a social networking system;

receive a plurality of requests for social network information, wherein each request originates from one or more external systems outside of the social networking system, and the social network information is maintained by the social networking system and is associated with the user account of the social networking system; and determine whether a user account of the one or more external systems is linked to the user account of the social networking system, and determine the single login status of the user account of the social networking system, and responsive to determining the single login status and whether the user accounts are linked:

if the single login status indicates that the user account of the social networking system is not logged in, require authentication information for the user account of the social networking system before responding to the request with the social network information and responsive to receiving information indicative of successful authentication, updating the single login status to indicate that the user account of the social networking system is logged in, or, if the single login status indicates that the user account of the social networking system is logged in and the user accounts are linked, respond to each request by providing the social network information to the one or more external systems and provide access to the one or more external systems from the other external systems.

* * * * *